(12) United States Patent
Ger et al.

(10) Patent No.: US 11,940,660 B2
(45) Date of Patent: Mar. 26, 2024

(54) OSFP OPTICAL TRANSCEIVER WITH A DUAL MPO RECEPTACLE

(71) Applicant: Mellanox Technologies, Ltd., Yokneam (IL)

(72) Inventors: Andrey Ger, Shlomi (IL); Rony Setter, Kfar Glikson (IL); Yaniv Kazav, Hadera (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/105,950

(22) Filed: Feb. 6, 2023

(65) Prior Publication Data

US 2023/0266546 A1    Aug. 24, 2023

Related U.S. Application Data

(63) Continuation of application No. 16/750,632, filed on Jan. 23, 2020, now Pat. No. 11,573,383.

(51) Int. Cl.
*G02B 6/42* (2006.01)
*G02B 6/38* (2006.01)
*G02B 6/40* (2006.01)

(52) U.S. Cl.
CPC .......... *G02B 6/426* (2013.01); *G02B 6/3853* (2013.01); *G02B 6/3881* (2013.01); *G02B 6/3893* (2013.01); *G02B 6/406* (2013.01); *G02B 6/4269* (2013.01); *G02B 6/4262* (2013.01)

(58) Field of Classification Search
CPC ..................................................... G02B 6/423
See application file for complete search history.

(56) References Cited

U.S. PATENT DOCUMENTS

| 9,235,013 B1 * | 1/2016 | Chan ................. G02B 6/3893 |
| 9,793,667 B1 * | 10/2017 | Park .......................... H04Q 1/02 |
| 10,191,221 B1 | 1/2019 | Leigh et al. |

(Continued)

FOREIGN PATENT DOCUMENTS

| CN | 105278050 | 1/2016 |
| DE | 102005004806 B3 | 6/2006 |

OTHER PUBLICATIONS

European Search Report from European Application No. 21152953.2, dated Jun. 23, 2021, 8 pages.

(Continued)

*Primary Examiner* — Eric Wong
(74) *Attorney, Agent, or Firm* — Moore & Van Allen PLLC; Michael M. McCraw

(57) ABSTRACT

An OSFP optical transceiver having split multiple fiber optical port using reduced amount of MPO terminations is provided that includes two adjacent sockets integrated into the optical port of the OSFP optical transceiver. The two adjacent sockets are vertically oriented with respect to the mounting baseplate of the OSFP optical transceiver, and each of the two adjacent sockets is adapted to receive an MPO receptacle that terminates the proximal end of a bundle of fibers. The OSFP optical transceiver also includes an optical connection between each socket and a corresponding lens in the OSFP optical transceiver, for transmitting optical signals received from other transceivers into the OSFP optical transceiver and optical signals generated in the OSFP optical transceiver to other transceivers.

20 Claims, 4 Drawing Sheets

(56) References Cited

U.S. PATENT DOCUMENTS

| | | | |
|---|---|---|---|
| 2013/0077921 A1* | 3/2013 | Meng | G02B 6/4292 |
| | | | 385/93 |
| 2013/0230278 A1 | 9/2013 | Hung et al. | |
| 2014/0348468 A1* | 11/2014 | Lagziel | G02B 6/4284 |
| | | | 29/825 |
| 2014/0348470 A1 | 11/2014 | Kuang et al. | |
| 2019/0064448 A1* | 2/2019 | Parsons | G02B 6/3825 |
| 2019/0229809 A1* | 7/2019 | Leigh | H04J 14/02 |
| 2020/0018909 A1 | 1/2020 | Chang | |

OTHER PUBLICATIONS

Office Action for Chinese Patent Application CN 202110006760.3, dated Jan. 28, 2022.

\* cited by examiner

OSFP OPTICAL TRANSCEIVER WITH A DUAL MPO RECEPTACLE

CROSS-REFERENCE TO RELATED APPLICATIONS

This application is a continuation of U.S. application Ser. No. 16/750,632, filed Jan. 23, 2020, the disclosure of which application is herein incorporated by reference in its entirety.

TECHNOLOGICAL FIELD

Example embodiments of the present invention relate to the field of optical connectors and transceiver interfaces. More particularly, the invention relates to an Octal Small Form factor Pluggable (OSFP) optical transceiver with a dual Multi-fiber Push On (MPO) receptacle interface.

BACKGROUND

Multi-fiber Push On (MPO) connectors are fiber connectors that consist of multiple optical fibers and are available with 8, 12, 16, or 24 fibers for data center and LAN applications (e.g., large scale optical switches require super high-density multi-fiber arrays with MPOs of 32, 48, 60 or even 72 fibers). MPO Connectors must comply with inter-mateability standards that specify the physical attributes of the connector, such as pin and guide hole dimensions for male and female interfaces, so as to ensure that any compliant plugs and adapters may be intermated and meet a certain level of performance.

MPO Connectors have been used in duplex 10 Gig fiber applications throughout data centers for several years. As the need for bandwidth speeds pushed beyond 10 Gig, the MPO connector became the interface for higher speed switch-to-switch backbone data center applications using parallel optics. For example, 40 Gig and 100 Gig applications over multimode fiber use 8 fibers with 4 transmitting at either 10 Gbps or 25 Gbps and 4 receiving at either 10 Gbps or 25 Gbps. For fiber links to properly send data, the transmit signal (Tx) at one end of the cable must match the corresponding receiver (Rx) at the other end. The purpose of any polarity scheme is to ensure this continuous connection, and this becomes more complex when dealing with multi-fiber components.

FIG. 1 (prior art) illustrates a perspective view of a standard MPO male connector 10 which receives a group 11 of 12 fibers, arranged in an interfacing row, where each fiber has a corresponding position P1, . . . , P12 in the interfacing row. Two guiding pins 12a and 12b are used to guide the interfacing row to intermate a corresponding group of 12 fibers of a standard MPO female connector. A key 13 is formed in the MPO connector body to determine the polarity of the group (e.g., MPO connectors have a key on one side of the connector body). When the connector key faces up (referred to as "key up"), the positions of the fibers within the connector run in a sequence from left to right from position 1 (P1) to position 12 (P12). The key also ensures that the connector may be inserted only one way into an MPO adapter or transceiver port).

FIG. 2 (prior art) illustrates a perspective view of a standard connection between an MPO male connector 201 and an MPO female connector 202, using an MPO adapter 203. In this example, MPO male connector 201 is with key up and the MPO female connector 202 is with key down, such that the MPO adapter 203 reverses the polarity of connection between them. Of course, other connections with different polarity are available with a corresponding adapter.

Some applications require splitting an optical channel into two channels, such as splitting the output of an OSFP transceiver (which comprises a group of 16 fibers, 8 fibers for Tx and 8 for Rx) into two groups of 8 fibers (4 fibers for Tx and 4 for Rx) each group is compatible with the optical port of a Quad Small Form-factor Pluggable (QSFP) transceiver, or of de-populated QSFP-DD or OSFP transceivers.

FIG. 3 (prior art) illustrates a way to create an optical split by using a single MPO receptacle 30 in the OSFP transceiver 31. A split cable (MPO to 2MPO) 32 is plugged into the MPO receptacle 30a thereby creating a pigtailed transceiver (i.e., the OSFP transceiver is terminated with a single, short, optical fiber called a "pigtail" that has an optical connector pre-installed on one end and a length of exposed fiber at the other end) that feeds two QSFP or of de-populated QSFP Double Density (QSFP-DD) or OSFP transceivers, 33a and 33b. However, this solution is problematic due to several reasons. First, such a solution limits the customer, since a pigtail connection has a fixed length of approximately 1 m and longer fibers require 5 MPO connections (terminations) 30c-30g and two adapters 103a and 103b MPO terminations 30h-30i belong to the optical ports of the QSFP transceivers. Second, it requires a patch panel at the customer side for providing the required connectivity between all fibers. Third, using multiple MPO terminations and adapters creates high optical loss and reflection in the fiber paths.

Conventional solutions also require a patch panel at the client side. Such a patch panel usually consists of adapters, fiber management elements (e.g., bend limiters and the like), and a mechanical chassis to accommodate all elements and mount the chassis to the rack. However, a patch panel is expensive and consumes datacenter rack space.

It is therefore an object of the present invention to provide a method and transceiver design adapted to split an optical channel into two channels, with a reduced amount of necessary MPO terminations.

It is a further object of the present invention to provide a method and transceiver design adapted to split an optical channel into two channels, without requiring optical adapters.

It is still another object of the present invention to provide a method and transceiver design with reduced optical loss and back reflections.

It is yet another object of the present invention to provide a method and transceiver design which provide more length flexibility to a customer.

It is still a further object of the present invention to provide a method and transceiver design adapted to split an optical channel into two channels, without requiring a patch panel.

Other objects and advantages of the invention will become apparent as the description proceeds.

BRIEF SUMMARY

A method for splitting a multiple fiber optical port of an OSFP optical transceiver, using reduced amount of MPO terminations, according to which two adjacent sockets being adapted to receive two independent bundles of fibers from the optical port, are integrated into the optical port of the OSFP optical transceiver. The two adjacent sockets are vertically oriented with respect to the mounting baseplate of the OSFP optical transceiver. The proximal end of each of the bundles is terminated with an MPO receptacle. Each of the MPO receptacles is inserted into a corresponding vertically oriented socket.

In one aspect, the distal end of each of the bundles is terminated with another MPO receptacle and each another MPO receptacle is connected to an optical port of a transceiver, such as a Quad Small Form-factor Pluggable (QSFP) transceiver or to de-populated QSFP-DD or OSFP transceivers.

A longitudinal groove may be formed along the upper cover of the OSFP optical transceiver by declining the upper wall portion of the OSFP optical transceiver that is above the two adjacent sockets at the centre of the upper wall portion, such that the declined wall portion follows the inner arcuate contour line of each MPO receptacles An additional longitudinal groove may be formed along the upper cover of the OSFP optical transceiver by declining the upper wall portion of the OSFP optical transceiver being above the two adjacent sockets at each lateral edge, such that the declined wall portion follows the opposing arcuate contour line of each MPO receptacles.

The formed longitudinal grooves may coincide with the spacing between adjacent longitudinal ribs formed in the upper cover.

In order to obtain a desired polarity of intermating groups of fibers, the keys of the MPO receptacles may be directed according to the following:
outwardly, in opposing directions;
inwardly, in opposing directions;
leftward or rightward in the same direction.

An OSFP optical transceiver having split multiple fiber optical port, using reduced amount of MPO terminations, comprising, comprising:
a) two adjacent sockets integrated into the optical port of the OSFP optical transceiver, the two adjacent sockets being vertically oriented with respect to the mounting baseplate of the OSFP optical transceiver, and each of the two adjacent sockets is adapted to receive an MPO receptacle that terminates the proximal end of a bundle of fibers; and
b) an optical connection between each socket and a corresponding lens in the OSFP optical transceiver, for:
b.1) transmitting optical signals received from other transceivers into the OSFP optical transceiver;
b.2) transmitting optical signals generated in the OSFP optical transceiver to other transceivers.

Each bundle may comprise eight optical fibers.

The sockets may be made of metal, plastic, or any other suitable polymer and may be separated from each other or unified to form one piece which is adapted to receive two MPO receptacles.

BRIEF DESCRIPTION OF THE DRAWINGS

The above and other characteristics and advantages of the invention will be better understood through the following illustrative and non-limitative detailed description of embodiments thereof, with reference to the appended drawings, wherein.

DETAILED DESCRIPTION

The present invention proposes an optical transceiver design adapted to split an optical channel into two channels, with reduced amount of necessary MPO terminations. This is done by integrating two MPO receptacles into a single OSFP transceiver, thereby reducing the amount of necessary MPO terminations, reducing the optical loss and back reflections, and providing more length flexibility to customer. The proposed optical transceiver design allows using standard, cost efficient and mechanically robust MPO connectors, rather than using customized (non-standard) and mechanically weaker connectors, specifically designed for such applications.

Figure 3:
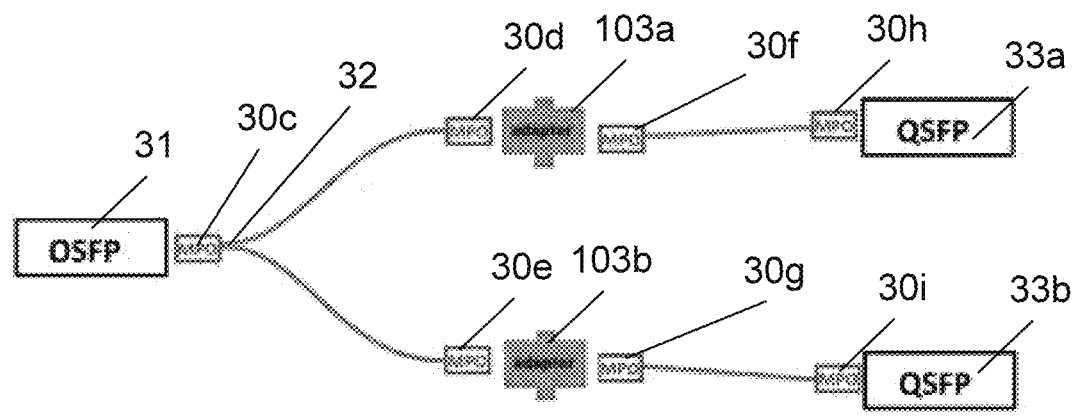
FIG. 3 (prior art) illustrates a way to create an optical split is by using a single MPO receptacle in the OSFP transceiver and a split cable (MPO to 2MPO) to feed two (QSFP) transceivers (or of de-populated QSFP-DD or OSFP transceivers)
Figure 4:
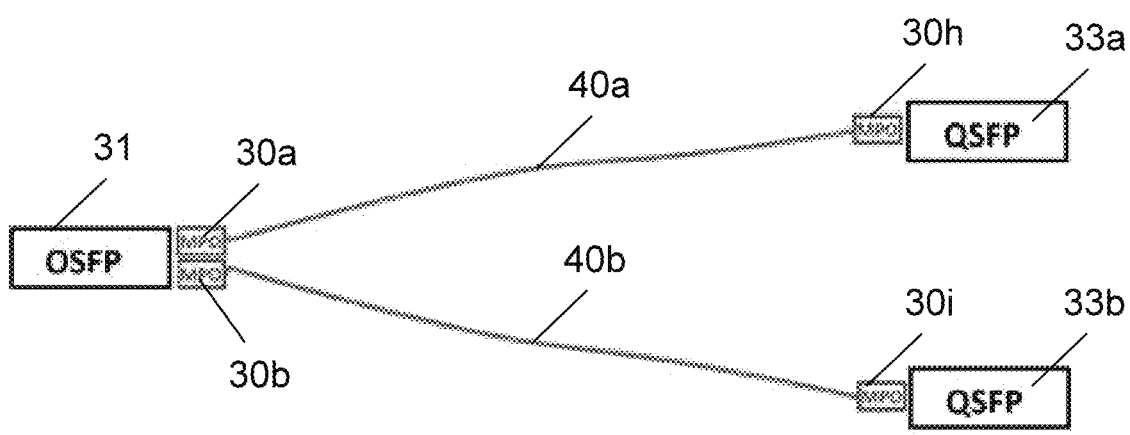
FIG. 4 is a schematic view of the optical transceiver design, according to an embodiment of the invention.

FIG. 4 is a schematic view of the optical transceiver design, according to an embodiment of the invention. As seen, the single MPO receptacle (30c in FIG. 3) is replaced by two MPO receptacles 30a and 30b, which are integrated into a single OSFP transceiver 31. MPO receptacles 30a and 30b feed the two QSFP transceivers, 33a and 33b, respectively, via two independent bundles 40a and 40b, each of four optical fibers.

Figure 5:
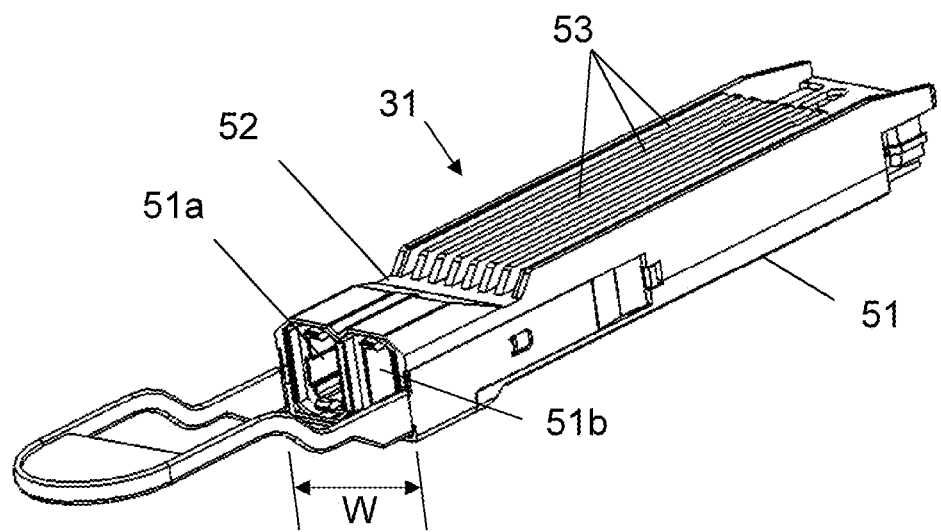
FIG. 5 illustrates a perspective view of the mechanical implementation of two MPO receptacles, which are integrated into a single OSFP transceiver.

FIG. 5 illustrates a perspective view of the mechanical implementation of such integration. Typically, the body of OSFP optical transceiver 31 has a mounting baseplate 51 and an upper cover 52 with a plurality of formed cooling ribs 53, for dissipating the heat generated by the transceiver's hardware.

Figure 1:
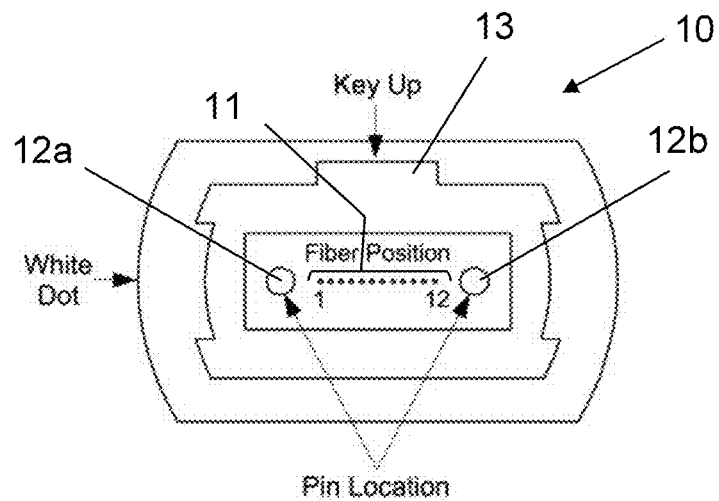
FIG. 1 (prior art) illustrates a perspective view of a standard MPO male connector which receives a group of 12 fibers, arranged in an interfacing row, where each fiber has a corresponding position in the interfacing row.
Figure 2:
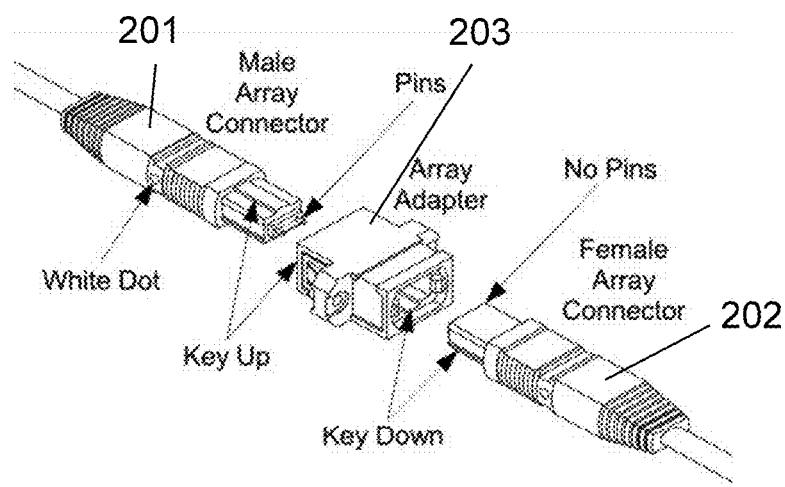
FIG. 2 (prior art) illustrates a perspective view of a standard connection between an MPO male connector and an MPO female connector, using an MPO adapter.

In this example, the body of OSFP optical transceiver 31 is terminated with dual sockets 51a and 51b which are adapted to receive the two MPO receptacles 30a and 30b, respectively, each in a vertical orientation with respect to (rather than a typical horizontal orientation, shown in FIG. 1 above, in which the row of fibers is arranged horizontally with respect to mounting baseplate 51 or cover 52). This unique vertical orientation allows reducing the total width W occupied by both MPO receptacles 30a and 30b and fitting the standard dimensions of the OSFP optical transceiver 31. Sockets 51a and 51b may be made of plastic or any other suitable polymer and may be separated from each other or may be unified to form one piece which is adapted to receive two MPO receptacles.

Figure 6:
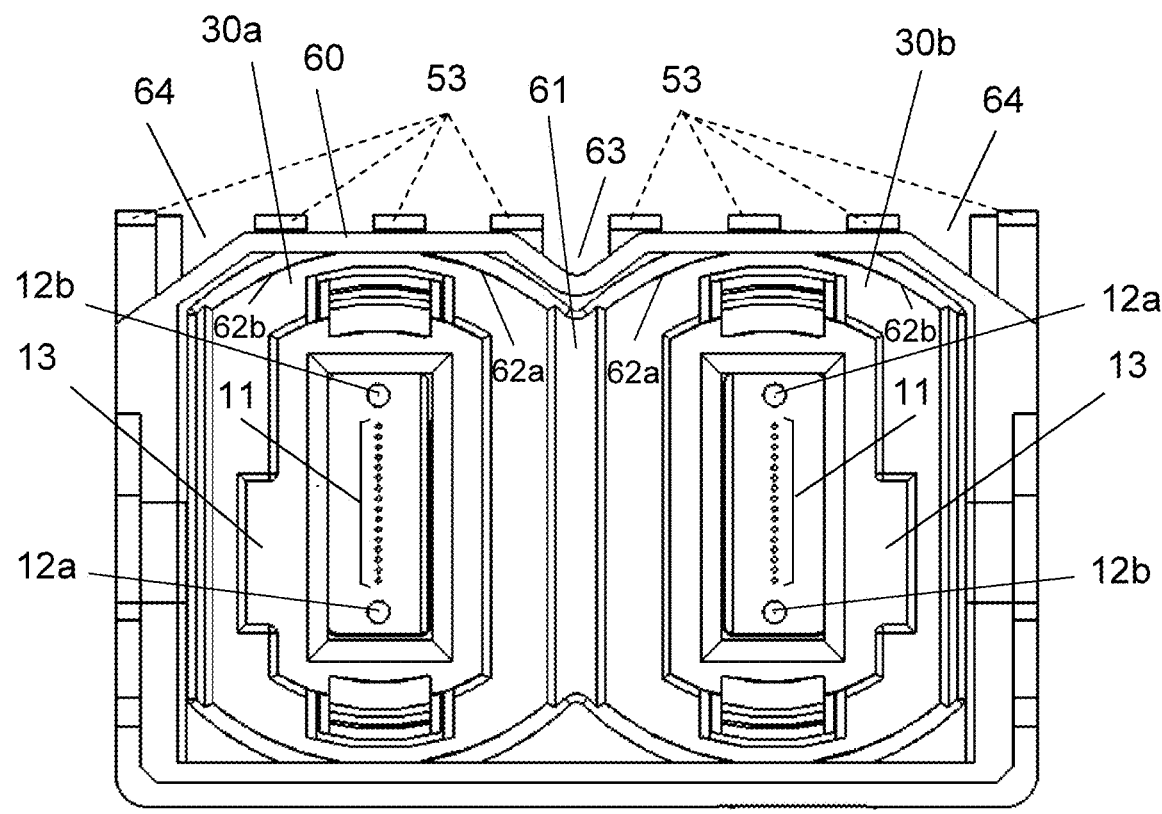
FIG. 6 is an enlarged front view or the OSFP optical transceiver with both MPO receptacles inserted inside the sockets of FIG. 5.

FIG. 6 is an enlarged front view or the OSFP optical transceiver 31 with both MPO receptacles 30a and 30b inserted inside sockets 51a and 51b of FIG. 5. In this example, MPO receptacles 30a and 30b are adjacent to each other, where a partition wall 61 separates between them. The upper wall 60 of the OSFP optical transceiver housing is declined at the centre to follow the (inner) arcuate contour line 62a of each MPO receptacles, so as to form a longitudinal groove 63 along the upper cover 52. In addition, the upper wall 60 of the OSFP optical transceiver housing is also declined at each lateral edge to follow the opposing arcuate contour line 62b of each MPO receptacles, so as to form additional longitudinal grooves 64 along the upper cover 52. The formed longitudinal grooves 63 and 64 coincide with the spacing between adjacent (longitudinal) ribs 53 and therefore, improve heat evacuation from the OSFP optical transceiver 31.

In this example, the keys 13 of the MPO receptacles are directed outwardly, in opposing directions, so as to obtain a desired polarity of intermating groups 11 of fibers. However, it is clear that sockets 51a and 51b may be so designed to allow the MPO receptacles 30a and 30b to be inserted such that the keys 13 of each MPO receptacles are directed inwardly, in opposing directions, or leftward or rightward in the same direction, so as to obtain other desired polarities of intermating groups 11 of fibers. Guiding pins 12a and 12b (or guiding holes in case of female MPO connectors) are also (vertically) arranged accordingly.

Figure 7:
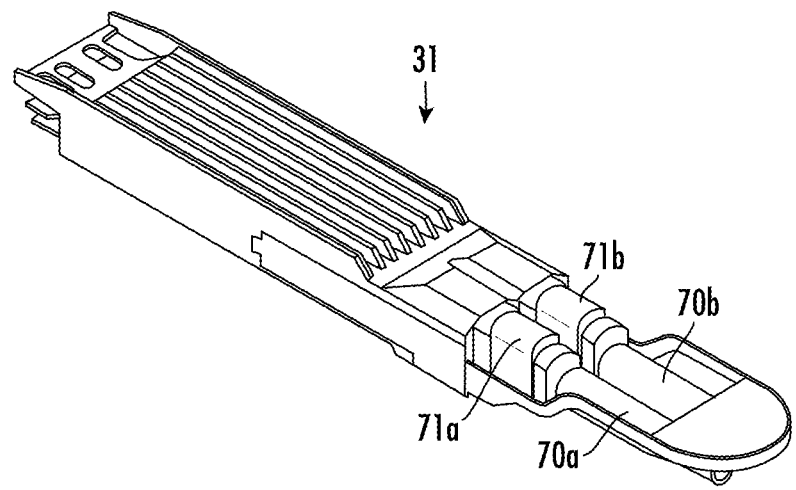
FIG. 7 illustrates the connection of two cables (each wrapping a bundle of fibers and terminated with an interfacing MPO receptacles) to OSFP optical transceiver via the sockets.

FIG. 7 illustrates the connection of two cables 70a and 70b (each wrapping a bundle of fibers and terminated with an interfacing MPO receptacles 30a or 30b, respectively) to OSFP optical transceiver 31 via sockets 51a and 51b, respectively. Quick connection and disconnection of each cable 70a or 70b is enabled by two sliding lock sleeves 71a and 71b, which when being pushed toward the corresponding socket, lock the inserted MPO receptacles 30a and 30b, respectively to sockets 51a and 51b, and when being pushed in the opposite direction, unlock MPO receptacles 30a and 30b from sockets 51a and 51b, thereby unlocking cables 70a and 70b from the OSFP optical transceiver 31. Locking may be implemented using any appropriate mechanism (not shown), such as opposing elastic projections or the like.

Figure 8:
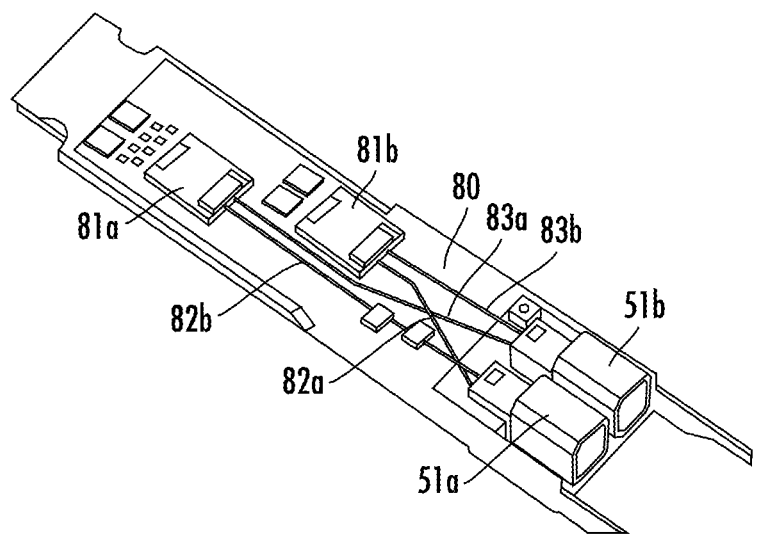
FIG. 8 illustrates the connection of the MPO receptacles to the Printed Circuit Board (PCB) of the OSFP optical transceiver.

FIG. 8 illustrates the connection of the MPO receptacles 30a or 30b to the Printed Circuit Board (PCB) 81 of the OSFP optical transceiver 31. PCB 81 comprises optical lenses 81a and 81b and associated processing components adapted to receive and process optical signals incoming from fibers and to transmit optical signals over these fibers. In this example, each lens is adapted to process receive (Rx) and transmit (Tx) channels, so a bundle 82a of Rx fibers is connected to socket 51a and a bundle 83b of Tx fibers is connected to socket 51b. Similarly, a bundle 82b of Rx fibers is connected to socket 51a and a bundle 83a of Tx fibers is connected to socket 51b.

The MPO receptacles 30a or 30b are inserted into sockets 51a and 51b, respectively. In this example, each socket ends with two bundles of fibers: Socket 51a ends with a bundle 82a with Rx fibers that receive optical signals from lens 81b and a bundle 82b with Tx fibers that transmit optical signals to lens 81a. Similarly, socket 51b ends with a bundle 83a with Rx fibers that receive optical signals from lens 81a and a bundle 83b with Tx fibers that transmit optical signals to lens 81b. Of course, other connections of Tx and Rx bundles are possible, depending on the application.

The above examples and description are provided only for the purpose of illustration and are not intended to limit the invention in any way. As will be appreciated by one of ordinary skill in the art in light of the present disclosure, the invention may be carried out in a great variety of ways (such as integrating into the optical port of the OSFP optical transceiver, a single socket adapted to receive an independent bundle of fibers from the optical port. The socket is vertically oriented with respect to the mounting baseplate of said OSFP optical transceiver), employing more than one technique from those described above, all without exceeding the scope of the invention.

The invention claimed is:

1. An Octal Small Form Factor Pluggable (OSFP) optical transceiver comprising:
an integral body defining:
a first end configured to engage the OSFP optical transceiver with a datacenter rack; and
a second end opposite the first end;
a first socket defined by the second end and integrated into an optical port of the OSFP optical transceiver, the first socket configured to receive a first Multi-fiber Push On (MPO) receptacle that terminates a proximal end of a first plurality of fibers;
a second socket adjacent the first socket, defined by the second end, and integrated into the optical port of the OSFP optical transceiver, wherein the second socket is adapted to receive a second MPO receptacle that terminates a proximal end of a second plurality of fibers, and
a first optical connection between the first socket and the first end so as to provide optical communication between the datacenter rack and the first MPO; and
a second optical connection between the second socket and the first end so as to provide optical communication between the datacenter rack and the second MPO.

2. The OSFP optical transceiver according to claim 1, wherein a width of the body measured at the mounting baseplate complies with an OSFP transceiver width standard.

3. The OSFP optical transceiver according to claim 1, wherein the first socket is configured to orient the first MPO receptacle substantially perpendicular with respect to a mounting baseplate of the body, and the second socket is configured to orient the second MPO receptacle substantially perpendicular with respect to the mounting baseplate of the body.

4. The OSFP optical transceiver according to claim 3, wherein a width of the body measured at the mounting baseplate complies with an OSFP transceiver width standard.

5. The OSFP optical transceiver according to claim 1, wherein the first socket is configured to orient the first plurality of fibers of the first MPO receptacle substantially perpendicular with respect to a mounting baseplate of the body, and the second socket is configured to orient the second plurality of fibers of the second MPO receptacle substantially perpendicular with respect to the mounting baseplate of the body.

6. The OSFP optical transceiver according to claim 5, wherein a width of the body measured at the mounting baseplate complies with an OSFP transceiver width standard.

7. The OSFP optical transceiver according to claim 1, further comprising a partition wall disposed between the first socket and the second socket.

8. The OSFP optical transceiver according to claim 7, wherein the partition wall is substantially perpendicular with respect to the mounting baseplate of the body.

9. The OSFP optical transceiver according to claim 1, wherein each of the first socket and the second socket further comprise one or more guiding pins or holes configured to engage the respective first and second MPO receptacles.

10. The OSFP optical transceiver according to claim 9, wherein the first socket is configured to orient the first plurality of fibers of the first MPO receptacle substantially perpendicular with respect to a mounting baseplate of the body, and the second socket is configured to orient the second plurality of fibers of the second MPO receptacle substantially perpendicular with respect to the mounting baseplate of the body, wherein the one or more guiding pins or holes are aligned with the respective first and second plurality of fibers.

11. The OSFP optical transceiver according to claim 1, wherein a distal end opposite the proximal end of the first plurality of fibers and a distal end opposite the proximal end of the second plurality of fibers are each terminated with respective MPO receptacles operably connected to a Quad Small Form-factor Pluggable (QSFP) transceiver, to a de-populated Quad Small Form-factor Pluggable Double density (QSFP-DD) transceiver, or to an OSFP transceiver.

12. The OSFP optical transceiver according to claim 1, wherein each of the first plurality of optical fibers and the second plurality of fibers comprise eight optical fibers.

13. The OSFP optical transceiver according to claim 1, wherein the sockets comprise a metal, plastic, or polymer material.

14. The OSFP optical transceiver according to claim 1, wherein the first socket and the second socket are formed separated from each other.

15. The OSFP optical transceiver according to claim 1, wherein the first and the second sockets are unified to form a single piece adapted to receive the first and the second MPO receptacles.

16. The OSFP optical transceiver according to claim 1, wherein the first socket is configured to receive the first MPO receptacle having a first key, and a polarity of the first plurality of fibers is based upon a position at which the first socket receives the first key.

17. The OSFP optical transceiver according to claim 1, wherein the second socket is configured to receive the second MPO receptacle having a second key, and a polarity of the second plurality of fibers is based upon a position at which the second socket receives the second key.

18. The OSFP optical transceiver according to claim 1, wherein the first end of the body further comprises one or more optical lenses configured to optically connect the first end with and the first and second sockets.

19. The OSFP optical transceiver according to claim 1, wherein the first optical connection further comprises:
   a transmit fiber bundle optically connecting the first socket and a first optical lens of the first end such that signals from the first socket may be received by the first optical lens; and
   a receive fiber bundle optically connecting the first socket and a second optical lens of the first end such that signals from the second optical lens may be received by the first socket.

20. The OSFP optical transceiver according to claim 19, wherein the second optical connection further comprises:
   a transmit fiber bundle optically connecting the second socket and the second optical lens of the first end such that signals from the second socket may be received by the second optical lens; and
   a receive fiber bundle optically connecting the second socket and the first optical lens of the first end such that signals from the first optical lens may be received by the second socket.

* * * * *